United States Patent
Petz

(10) Patent No.: US 9,868,346 B2
(45) Date of Patent: Jan. 16, 2018

(54) METHOD FOR OPERATING A HYBRID DRIVE SYSTEM FOR A MOTOR VEHICLE AND A HYBRID DRIVE DEVICE

(71) Applicant: AUDI AG, Ingolstadt (DE)

(72) Inventor: Andreas Petz, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/203,100

(22) Filed: Jul. 6, 2016

(65) Prior Publication Data

US 2017/0028838 A1 Feb. 2, 2017

(30) Foreign Application Priority Data

Jul. 29, 2015 (DE) .................. 10 2015 009 901

(51) Int. Cl.

| | |
|---|---|
| *B60K 6/54* | (2007.10) |
| *B60K 6/48* | (2007.10) |
| *B60W 10/06* | (2006.01) |
| *B60W 10/08* | (2006.01) |
| *B60W 10/10* | (2012.01) |
| *B60W 20/00* | (2016.01) |
| *B60W 20/30* | (2016.01) |
| *B60W 20/15* | (2016.01) |
| *B60K 6/442* | (2007.10) |

(52) U.S. Cl.
CPC ............ *B60K 6/54* (2013.01); *B60K 6/442* (2013.01); *B60K 6/48* (2013.01); *B60W 10/06* (2013.01); *B60W 10/08* (2013.01); *B60W 10/10* (2013.01); *B60W 20/00* (2013.01); *B60W 20/15* (2016.01); *B60W 20/30* (2013.01); *B60K 2006/4825* (2013.01); *B60W 2510/081* (2013.01); *B60W 2510/087* (2013.01); *B60W 2550/12* (2013.01); *B60W 2710/081* (2013.01); *B60W 2710/1005* (2013.01); *Y02T 10/6221* (2013.01); *Y02T 10/6252* (2013.01)

(58) Field of Classification Search
CPC ..................... B60W 2510/087; B60K 6/54
See application file for complete search history.

(56) References Cited

U.S. PATENT DOCUMENTS

| | | | |
|---|---|---|---|
| 7,658,261 B2 | 2/2010 | Pfund | |
| 2008/0315814 A1* | 12/2008 | Takizawa | ............... B60L 15/00 318/434 |

(Continued)

FOREIGN PATENT DOCUMENTS

| | | |
|---|---|---|
| DE | 11 2012 002 016 T5 | 2/2014 |
| DE | 10 2013 007 354 | 10/2014 |

(Continued)

OTHER PUBLICATIONS

European Search Report dated Dec. 9, 2016 in counterpart European Patent Application No. EP 16 00 1012.

(Continued)

*Primary Examiner* — Brian L Swenson
(74) *Attorney, Agent, or Firm* — Henry M. Feiereisen LLC

(57) ABSTRACT

In a method for operating a hybrid drive device of a motor vehicle, a speed ratio between an electric machine of the hybrid drive device and an output shaft of the hybrid drive device is reduced by a transmission, when a temperature of the electric machine exceeds a first temperature limit value.

16 Claims, 1 Drawing Sheet

(56) References Cited

U.S. PATENT DOCUMENTS

| | | | | |
|---|---|---|---|---|
| 2009/0105037 A1* | 4/2009 | Hong | ............. | B60K 1/00 |
| | | | | 701/22 |
| 2011/0119014 A1* | 5/2011 | Pushkolli | ............. | B60K 6/48 |
| | | | | 702/99 |
| 2011/0232980 A1 | 9/2011 | Nomura et al. | | |
| 2012/0303199 A1* | 11/2012 | Oba | ............. | B60K 6/445 |
| | | | | 701/22 |
| 2014/0088812 A1 | 3/2014 | Kobayashi et al. | | |
| 2015/0141198 A1* | 5/2015 | Tomo | ............. | B60W 10/02 |
| | | | | 477/5 |

FOREIGN PATENT DOCUMENTS

| | | |
|---|---|---|
| EP | 1 775 449 A1 | 4/2007 |
| JP | 2005-263061 | 9/2005 |

OTHER PUBLICATIONS

English translation of European Search Report dated Dec. 9, 2016 in counterpart European Patent Application No. EP 16 00 1012.

* cited by examiner

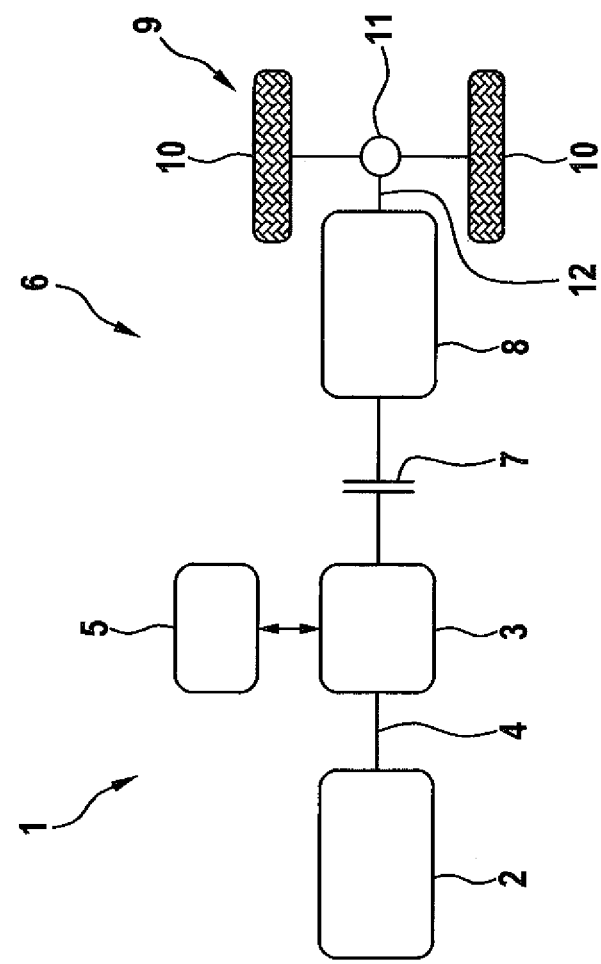

METHOD FOR OPERATING A HYBRID DRIVE SYSTEM FOR A MOTOR VEHICLE AND A HYBRID DRIVE DEVICE

CROSS-REFERENCES TO RELATED APPLICATIONS

This application claims the priority of German Patent Application, Ser. No. 10 2015 009 901.9, filed Jul. 29, 2015, pursuant to 35 U.S.C. 119(a)-(d), the disclosure of which is incorporated herein by reference in its entirety as if fully set forth herein.

BACKGROUND OF THE INVENTION

The present invention relates to a method for operating a hybrid drive device for a motor vehicle, and to a hybrid drive device.

The following discussion of related art is provided to assist the reader in understanding the advantages of the invention, and is not to be construed as an admission that this related art is prior art to this invention.

A hybrid drive device is used to drive a motor vehicle, and thus consequently to provide the torque for propelling the motor vehicle. The hybrid drive device includes hereby a plurality of drive units, in particular a plurality of drive units of varying types. One drive unit may be an engine, e.g. an internal combustion engine. Another example of a drive unit is an electric machine. The hybrid drive device is capable to provide the torque from only the engine or only from the electric machine, for example. At least temporarily, however, both these drive units may also be operatively connected to each other to provide the driving torque together.

The hybrid drive device has an output shaft which is operatively connected, rigidly and/or permanently, to wheels of the motor vehicle. A transmission is operatively connected, also rigidly and/or permanently, to the output shaft. A clutch may also be provided between the transmission and the output shaft, e.g. a starting clutch. As an alternative, the clutch or starting clutch may also be arranged between the transmission and the electric machine. A further clutch, in particular a separating clutch, may be arranged between the engine and the electric machine so as to be able to couple the engine to the electric machine. The engine may be permanently operatively connected to the electric machine.

During driving operation of the motor vehicle, both the engine and the electric machine are operatively connected to the output shaft of the transmission of the hybrid drive device, with both these drive units providing at least part of the driving torque. The electric machine can also be operated as a generator or dragged by the engine.

It would be desirable and advantageous to provide an improved method for operating a hybrid drive system for a motor vehicle to obviate prior art shortcomings and to provide a better thermal management of the electric machine while being reliable in operation.

SUMMARY OF THE INVENTION

According to one aspect of the present invention, a method for operating a hybrid drive device of a motor vehicle includes reducing a speed ratio between an electric machine of the hybrid drive device and an output shaft of the hybrid drive device by a transmission, when a temperature of the electric machine exceeds a first temperature limit value.

During operation of the electric machine to generate part of the driving torque, heat is generated to thereby raise the temperature of the electric machine. Heat is also generated, when the electric machine is dragged by the engine and is operated virtually free from torque.

The hybrid drive device thus provides the torque solely by the engine. Still, the electric machine is dragged due to its coupling to the output shaft and the engine. Due to eddy currents, heat is also generated in this operating state and may cause the electric machine to heat up. For example, when the driving torque is produced solely by the engine at high speed over a longer time period, the temperature of the electric machine may rise significantly.

When the temperature exceeds the first temperature limit value, further rise in temperature should be prevented as much as possible or heat input into the electric machine should be reduced. The transmission is therefore used for this purpose in order to reduce the speed ratio between the electric machine and the output shaft. Thus, at constant speed of the output shaft, the rotation speed of the electric machine is reduced, so that also eddy currents and accompanying heat are reduced. Advantageously, the speed ratio is chosen such that the travel of the motor vehicle can be continued without interference. Advantageously, the reduced speed ratio is selected such that despite the reduction, the driving torque produced by the hybrid drive device or the engine corresponds to a target torque, which is, for example, requested by a driver of the motor vehicle and/or a driver assistance device.

According to another advantageous feature of the present invention, a lower maximum rotation speed is set at a transmission control unit of the transmission, when the temperature of the electric machine exceeds the first temperature limit value. The maximum rotation speed set at the transmission control unit is thus temperature-dependent. Hence, a first maximum rotation speed can be set at the transmission control unit, when the temperature of the electric machine is smaller or equal to the first temperature limit value. However, when the temperature exceeds the first temperature limit value, a second maximum speed can be set at the transmission control unit, which is lower than the first maximum rotation speed. Of course, it can also be provided that the maximum rotation speed, set at the transmission control unit, is determined on the basis of the temperature of the electric machine, in particular with reference to a mathematical relationship, a map and/or a table.

The transmission control unit can be configured such as to limit the rotation speed of the electric motor or the engine in a direction of higher rotation speeds to the maximum rotation speed. Therefore, when the actual present rotation speed of the electric motor exceeds the maximum rotation speed, the transmission control unit can control the transmission such that the speed ratio between the electric motor and the output shaft is reduced to thereby realize afore-described effect.

According to another advantageous feature of the present invention, the transmission control unit can compare the temperature to the first temperature limit value and activate the transmission to reduce the speed ratio, when the temperature exceeds the first temperature limit value. The transmission control unit no longer has the maximum rotation speed as an input variable. Rather, the transmission control unit itself determines the temperature of the electric machine and compares it with the first temperature limit value. The first temperature limit value can also be provided as an input variable to the transmission control unit or may also be permanently stored in it. When determining that the temperature exceeds the first temperature limit value, the transmission control unit controls the transmission in a known manner for reducing the speed ratio.

According to another advantageous feature of the present invention, the electric machine can operate during normal operation of the hybrid drive device in one of three ways, a first way in which the electric machine is operated in a driving mode, a second way in which the electric machine is operated in a generator mode, and a third way in which the electric machine is operated in an idle mode, with the electric machine being switched to a safety mode in which the electric machine is permitted to operate only in the idle mode, when the temperature exceeds a second temperature limit value. Thus, the hybrid drive device operates in normal operating mode, when the temperature of the electric machine corresponds to or is less than the second temperature limit value. Of course, a switch from the safety mode to the normal operating mode is possible as soon as the temperature of the electric machine drops below or is equal to the second temperature limit value.

In the normal operating mode, the electric machine can be operated in several different modes. Thus, the electric machine can operate for example in the driving mode for providing at least part of the driving torque. Conversely, the electric machine can operate in generator mode as a generator for converting kinetic energy into electrical energy. In the idle mode, the electric machine is free of torque and is dragged by the output shaft and/or the engine. However, when the temperature of the electric machine exceeds the second temperature limit value, the electric machine is switched from the normal operating mode to the safety mode, in which the electric machine may only be operated in the idle mode. In the safety mode, heat is also generated due to eddy currents as previously described, but to a much lesser extent than in the driving mode and/or the generator mode.

According to another advantageous feature of the present invention, the second temperature limit value can be equal to or lower than the first temperature threshold limit value. As previously explained, the temperature of the electric machine or the heat generated in the electric machine can be reduced in different ways. For example, the transmission can reduce the speed ratio so as to decrease the rotation speed of the electric machine while the rotation speed of the output shaft remains constant. In addition, the electric machine can be switched from the normal operating mode to the safety mode.

While, of course, the second temperature limit value can correspond to the first temperature limit value, thus allowing simultaneous switching from the normal operating mode to the safety mode and reducing the speed ratio between the electric motor and the output shaft, it is currently preferred to implement a graduated safety concept. For this purpose, the second temperature limit value is smaller than the first temperature limit value. Provision is therefore made to first allow operation of the electric machine in the idle mode only, and only subsequently, if this is inadequate, to reduce the speed ratio between the electric machine and the output shaft.

According to another advantageous feature of the present invention, the temperature of the electric machine may involve a stator temperature, a rotor temperature and/or a coolant temperature. In principle, any temperature can be selected and determined. Suitably, the temperature reflects the actual state of the electric machine, in particular without delay or at least as promptly as possible. For example, the stator temperature or the rotor temperature can be used as the temperature and measured directly on the electric machine. In addition or as an alternative, the coolant temperature can be used. Of course, the temperature may also involve a temperature value which includes a plurality of temperatures or is formed from the plurality of temperatures. For example, a temperature value can be determined from the stator temperature, the rotor temperature and/or the coolant temperature, or any combinations thereof.

According to another advantageous feature of the present invention, the reduction in the speed ratio can be determined on the basis of at least one operational variable and/or environmental. While, of course, the speed ratio can be chosen freely or can be permanently stored, it is advantageous to determine the speed ratio on the basis of an operational variable and/or an environmental variable. For this purpose, a mathematical relationship, a map and/or a table can be used, with the operational variable and/or the environmental variable being input variables and the speed ratio being an output variable.

According to another advantageous feature of the present invention, the operational variable can include the temperature, the first temperature limit value and/or a temperature difference between the first temperature limit value and the temperature. Thus, the current temperature of the electric machine or the first temperature limit value enters directly into the speed ratio to be set. In particular, the speed ratio is selected smaller as the temperature of the electric machine increases or the temperature difference between the first temperature limit value and the temperature increases.

According to another advantageous feature of the present invention, an ambient temperature can be used as the environmental variable. The temperature of the electric machine depends primarily on the ambient temperature. When the ambient temperature is low, the electric machine is cooled more than at a high ambient temperature. Accordingly, it is advantageous to select the speed ratio smaller as the ambient temperature increases.

According to another aspect of the present invention, a hybrid drive device for a motor vehicle includes an output shaft, an engine, an electric machine, and a transmission configured to operatively connect the engine and the electric machine to the output shaft during travel of the motor vehicle and to reduce a speed ratio between the electric machine and the output shaft, when a temperature of the electric machine exceeds a first temperature limit value. The advantages of such a hybrid drive device have already been described above in connection with the method according to the present invention.

BRIEF DESCRIPTION OF THE DRAWING

Other features and advantages of the present invention will be more readily apparent upon reading the following description of currently preferred exemplified embodiments of the invention with reference to the accompanying drawing, in which the sole FIG. 1 is a schematic illustration of a drive device according to the present invention.

DETAILED DESCRIPTION OF PREFERRED EMBODIMENTS

The depicted embodiment is to be understood as illustrative of the invention and not as limiting in any way. It should also be understood that the FIGURE is may not necessarily be to scale. In certain instances, details which are not necessary for an understanding of the present invention or which render other details difficult to perceive may have been omitted.

Turning now to FIG. 1, there is shown a schematic illustration of a drive device 1 for a motor vehicle, for example. In the non-limiting example shown here, the drive device 1 is constructed in the form of a hybrid drive device. The drive device 1 includes at least two drive units, that is a first drive unit 2 and a second drive unit 3. The first drive unit 2 may be represented by an internal combustion engine, and the second drive unit 3 may be represented by of an electric machine, for example.

The two drive units 2, 3 can be rigidly and/or permanently operatively connected to each other via a shaft 4. The shaft 4 may, however, also be operatively connected to a separating clutch, by which the operative connection between the drive units 2, 3 can be interrupted. The second drive unit 3, i.e. the electric machine is activated by a power electronics 5, which, in turn, is operated by a control device, for example.

The hybrid drive device 1 represents part of a drive train 6 of a motor vehicle and includes in addition to the drive units 2, 3, a starting clutch 7 and a transmission 8. The transmission 8 is operatively connected to the hybrid drive device 1 via the clutch 7 or at least capable of being operatively connected. In the exemplary embodiment illustrated here, the drive train 6 has an axle 9 which is associated with two wheels 10. The axle 9 and the wheels 10 are advantageously operatively connected via an axle differential 11 with the transmission 8, in particular rigidly and/or permanently. As a result, the hybrid drive device 1 is able to propel the axle 9 and the wheels 10. An output shaft of the transmission 8 represents hereby the output shaft 12 of the hybrid drive device 1. The output shaft 12 provides an operative connection between the transmission 8 and the axle 9, in particular the axle differential 11, with the operative connection being rigid and/or permanent.

As the motor vehicle travels, both drive units 2, 3 are operatively connected to the output shaft 12 via the transmission 8. For example, the drive unit 3 is operated in an idle mode and dragged by the drive unit 2. Eddy currents produce, however, heat in the drive unit 3, causing an increase in temperature. This occurs particularly at high rotation speeds of the drive unit 3. When a temperature of the drive unit 3 now exceeds a first temperature limit value, the speed ratio between the drive unit 3 and the output shaft 12 should be reduced by the transmission 8, so that the rotation speed of the drive unit 3 is reduced while the rotation speed of the output shaft 12 remains constant. Such an approach is able to decrease the heat amount produced in the drive unit 3 and thus to reduce the temperature of the drive unit 3.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A method for operating a hybrid drive device of a motor vehicle, comprising:

reducing a speed ratio between an electric machine of the hybrid drive device and an output shaft of the hybrid drive device by a transmission, when a temperature of the electric machine exceeds a first temperature limit value; and operating the electric machine during normal operation of the hybrid drive device in one of three ways, a first way in which the electric machine is operated in a driving mode, a second way in which the electric machine is operated in a generator mode, and a third way in which the electric machine is operated in an idle mode, and switching the electric machine to a safety mode in which the electric machine is permitted to operate only in the idle mode, when the temperature exceeds a second temperature limit value.

2. The method of claim 1, further comprising setting a lower maximum rotation speed at a transmission control unit of the transmission, when the temperature of the electric machine exceeds the first temperature limit value.

3. The method of claim 2, wherein the transmission control unit compares the temperature to the first temperature limit value and activates the transmission to reduce the speed ratio, when the temperature exceeds the first temperature limit value.

4. The method of claim 1, wherein the second temperature limit value is equal to or lower than the first temperature limit value.

5. The method of claim 1, wherein the temperature of the electric machine involves a stator temperature, a rotor temperature and/or a coolant temperature.

6. The method of claim 1, wherein a reduction in the speed ratio is determined on the basis of at least one operational variable and/or environmental variable.

7. The method of claim 6, wherein the operational variable includes the temperature, the first temperature limit value and/or a temperature difference between the first temperature limit value and the temperature.

8. The method of claim 6, further comprising using an ambient temperature as an environmental variable.

9. A hybrid drive device for a motor vehicle, comprising:
an output shaft;
an engine;
an electric machine; and
a transmission configured to operatively connect the engine and the electric machine to the output shaft during travel of the motor vehicle and to reduce a speed ratio between the electric machine and the output shaft, when a temperature of the electric machine exceeds a first temperature limit value, wherein the electric machine is configured for operation during normal operation of the hybrid drive device in one of three ways, a first way in which the electric machine is operated in a driving mode, a second way in which the electric machine is operated in a generator mode, and a third way in which the electric machine is operated in an idle mode, said electric machine being switched to a safety mode in which the electric machine is permitted to operate only in the idle mode, when the temperature exceeds a second temperature limit value.

10. The hybrid drive device of claim 9, wherein the transmission includes a transmission control unit at which a lower maximum rotation speed is set, when the temperature of the electric machine exceeds the first temperature limit value.

11. The hybrid drive device of claim 10, wherein the transmission control unit is configured to compare the temperature to the first temperature limit value and to activate the transmission to reduce the speed ratio, when the temperature exceeds the first temperature limit value.

12. The method of claim 9, wherein the second temperature limit value is equal to or lower than the first temperature limit value.

13. The hybrid drive device of claim 9, wherein the temperature of the electric machine involves a stator temperature, a rotor temperature and/or a coolant temperature.

14. The hybrid drive device of claim 9, wherein the transmission is configured to reduce the speed ratio as a function of at least one operational variable and/or environmental variable.

15. The hybrid drive device of claim 14, wherein the operational variable includes the temperature, the first temperature limit value and/or a temperature difference between the first temperature limit value and the temperature.

16. The hybrid drive device of claim 14, wherein the environmental variable is an ambient temperature.

\* \* \* \* \*